US012635600B2

(12) United States Patent　　(10) Patent No.:　US 12,635,600 B2
Pereira de Camargo et al.　　(45) Date of Patent:　May 26, 2026

(54) INDEPENDENT FRONT PLATFORM FOR AGRICULTURAL MACHINES AND AGRICULTURAL HARVESTER

(71) Applicant: CNH Industrial Brasil Ltda., Nova Lima (BR)

(72) Inventors: Jean Carlos Pereira de Camargo, Piracicaba (BR); Alan Patrick Dos Santos, Sarzedo (BR); Nicholas Stephen Shane, Bennett, IA (US); Daenio Cleodolphi, Piracicaba (BR)

(73) Assignee: CNH Industrial Brasil Ltda., Nova Lima (BR)

( * ) Notice: Subject to any disclaimer, the term of this patent is extended or adjusted under 35 U.S.C. 154(b) by 586 days.

(21) Appl. No.: 18/017,844

(22) PCT Filed: Jul. 22, 2021

(86) PCT No.: PCT/BR2021/050310
§ 371 (c)(1),
(2) Date: Jan. 24, 2023

(87) PCT Pub. No.: WO2022/016249
PCT Pub. Date: Jan. 27, 2022

(65) Prior Publication Data
US 2023/0284559 A1　　Sep. 14, 2023

(30) Foreign Application Priority Data
Jul. 24, 2020　　(BR) ......................... 102020015139-8

(51) Int. Cl.
A01D 45/10　　(2006.01)
A01D 34/74　　(2006.01)
(Continued)

(52) U.S. Cl.
CPC ........... *A01D 34/74* (2013.01); *A01D 45/003* (2013.01); *A01D 45/10* (2013.01); *A01D 34/66* (2013.01); *A01D 63/02* (2013.01)

(58) Field of Classification Search
CPC ....... A01D 45/003; A01D 45/10; A01D 34/74
See application file for complete search history.

(56) References Cited

U.S. PATENT DOCUMENTS 2,723,521 A * 11/1955 Karlsson ................ A01D 45/10
408/67
3,103,091 A * 9/1963 Duncan .................. A01D 45/10
56/16.6
(Continued)

FOREIGN PATENT DOCUMENTS

BR　　102013029559 A2　　10/2015
BR　　102014005970 A2　　12/2015
(Continued)

OTHER PUBLICATIONS

Burch Jun. 4, 2019 Base Cutter for an Sugar Cane Harvest (Year: 2019).*
(Continued)

*Primary Examiner* — Alicia Torres
(74) *Attorney, Agent, or Firm* — Dority & Manning. P.A.

(57) ABSTRACT

A header to be coupled to an agricultural machine, such as harvesters of tall and stemmed plants, and sugar cane and sorghum harvesters. The header includes at least one base cutting assembly mounted in a floating manner in relation to a structural frame of the header through at least one pantographic arm and at least one actuator.

13 Claims, 9 Drawing Sheets

(51) Int. Cl.

| | | |
|---|---|---|
| *A01D 45/00* | (2018.01) | |
| *A01D 34/66* | (2006.01) | |
| *A01D 63/02* | (2006.01) | |

(56) References Cited

U.S. PATENT DOCUMENTS

| | | | | |
|---|---|---|---|---|
| 3,548,570 | A | * | 12/1970 | Suggs .................... A01D 45/10 |
| | | | | 56/10.2 R |
| 3,587,214 | A | * | 6/1971 | Willett ................... A01D 45/10 |
| | | | | 56/10.7 |
| 3,599,404 | A | * | 8/1971 | Fernandez ............. A01D 45/10 |
| | | | | 56/98 |
| 4,035,996 | A | * | 7/1977 | Fernandez ............. A01D 45/10 |
| | | | | 56/13.9 |
| 4,270,337 | A | * | 6/1981 | Pinto ...................... A01D 45/10 |
| | | | | 56/13.9 |
| 9,781,880 | B2 | * | 10/2017 | Cleodolphi .......... A01D 41/145 |
| 9,801,336 | B2 | * | 10/2017 | Palmute ................ A01D 45/10 |
| 10,356,982 | B2 | * | 7/2019 | Bertino ................. A01D 63/02 |
| 10,736,268 | B2 | * | 8/2020 | Seki ....................... A01D 45/10 |

FOREIGN PATENT DOCUMENTS

| | | | | |
|---|---|---|---|---|
| BR | 102015015922 A2 | | 2/2017 | |
| WO | WO-2014127005 A1 | * | 8/2014 | ............. A01D 45/10 |
| WO | WO-2015135049 A1 | * | 9/2015 | ............. A01D 34/60 |

OTHER PUBLICATIONS

International Search Report and Written Opinion for PCT Application No. PCT/BR2021/050310 dated Oct. 21, 2021 (9 pages).

* cited by examiner

INDEPENDENT FRONT PLATFORM FOR AGRICULTURAL MACHINES AND AGRICULTURAL HARVESTER

FIELD OF THE INVENTION

The present invention refers, in general, to a new model of independent header for agricultural machines, particularly those designed and known for harvesting tall and stemmed plants, and said header is formed by features designed and developed to improve the working conditions of these machines, but mainly to promote a more precise and safer cut of the plant stems and, with that, increase the productivity and efficiency of the harvests.

Furthermore, the present invention deals with an agricultural harvester intended for harvesting tall and stemmed plants, such as a sugar cane and sorghum harvester machine, to which a header is coupled, according to the object of the invention.

BACKGROUND OF THE INVENTION

There are, in the state of the art, numerous models of equipment and agricultural machinery developed to provide increased productivity in the harvest of different types of vegetable crops, for example, grain harvesters, forage harvesters and also the so-called harvesting machines for so-called tall and stemmed plants, such as sugar cane and sweet sorghum.

These machines intended for harvesting tall and stemmed plants are designed and developed to facilitate the harvesting of this specific type of crop, because their intrinsic characteristics require proper conditions for their proper processing, from cutting to transferring to the transfers and/or trailers.

In this context, it is known that these machines for harvesting tall and stemmed plants comprise a chassis that supports a series of conveyor and chopper rollers responsible for driving and chopping the sugar cane into billets, which are transferred to the transfers and/or trucks via an elevator. Also, said traditional sugar cane and/or sorghum harvesting machines reveal the limitation that the front components, such as row dividers, tipping rollers and base cutting discs, are fixed to the structural chassis of the machine. As experts in the field should appreciate, these front components and mechanisms are the ones most prone to damage, as they are responsible for absorbing the most intense impacts and, consequently, they are the ones that suffer most from wear and tear. Therefore, if any of these front components and mechanisms are damaged during the harvest and need to be repaired or replaced, the harvester machine needs to be conducted for proper maintenance and, therefore, the harvest ends up being interrupted until said machine returns from maintenance or to be replaced by another machine. These stoppages can results significant damage to farmers and producers, including the eventual loss of the harvest, in case this maintenance goes on too long.

In order to try to provide a solution to these drawbacks and limitations, the documents US 2014/0174048, from CNH America LLC., and BR102015015922-6 from CNH INDUSTRIAL BRASIL LTDA. disclose harvesters that are adapted to receive an independent header in the front portion of the machine. As can be seen, the structural chassis of this machine model lacks front components and mechanisms, such as row dividers, tipping rollers and base cutting discs, which are installed on the aforementioned independent header to allow farmers to make the necessary adaptations to their machine to meet the needs of each vegetable crop being harvested, for this purpose, they only need to replace their header with the respective basic elements for cutting the material.

In addition, as can be seen, with this flexibility it is possible to eliminate the need to stop the entire machine in the event of any damage to the components and front mechanisms that are in the structure of said independent header and, with that, the farmer only has to replace this header while carrying out the necessary maintenance. As a result, there is no longer the need to stop the harvesting process for long periods of time until a front element of the machine can be repaired.

Despite being highly functional and solving a series of problems revealed by the sugar cane and/or sweet sorghum harvesting machines known in the state of the art and mentioned above, in practice, it was observed that these agricultural equipment, particularly these independent headers for sugar cane and sorghum harvesting machines could be improved and perfected, mainly with regard to the issue of adapting and adjusting to different soil conditions, in particular the irregular and natural reliefs of the soil surface throughout the areas of plantations that are significantly extensive and wide.

In this context, it appears that the machines and independent platforms for harvesting sugar cane and sorghum known as in the state of the art reveal assemblies of fixed cutting discs in the structure of the platform and, with that, a possible height adjustment of the cutting discs requires the eventual movement and adjustment of the entire header and/or the structural chassis of the harvesting machine. As should be appreciated by those skilled in the art, this type of adjustment observed in the state of the art ends up consuming a lot of energy, fuel, in addition to requiring relatively high pressures in the pneumatic and/or hydraulic lines, which affects the work efficiency during the processes of harvest and, consequently, lowering the profitability of producers and farmers.

In addition, if it is necessary to adjust the height of only the cutting discs, maintaining the height of the other equipment and front mechanisms of the platform, it is not possible with the solutions known in the state of the art, considering that the height adjustment of these models of equipment is integral, since the mentioned assemblies of cutting discs are fixed adjacent to the structure of the header.

These inconveniences can still be aggravated in cases where the independent headers are those capable of executing the harvest of multiple planting rows, having more than one cutting discs assembly. This is because, in these cases, there is still the possibility that the different planting rows are at different levels and, consequently, the state of the art agricultural equipment needs to be adjusted to cut the taller plants and, in this way, there will be a significant loss of material that was not harvested, considering that the cutting of the planting row that is lower will occur above the recommended height.

Thus, as can be seen, despite currently meeting the needs, agricultural equipment known in the state of the art, especially those independent headers developed to be coupled and uncoupled from harvesting machines, reveal some limitations and inconveniences that could be eliminated, providing a practical, functional and efficient solution, improving the working conditions mainly of the assemblies of base cutting discs and, in this way, increasing the efficiency of the machines, but also the profitability of producers and farmers.

Therefore, these are, among others, the objectives and solutions that are intended to be achieved with the development of the present invention.

DESCRIPTION OF THE INVENTION

Therefore, the present invention aims to provide a new independent header for agricultural machines, such as those used for harvesting sugar cane and sorghum, consisting of technical, constructive, and functional aspects designed and developed to improve the conditions of work with assemblies of base cutting discs and, as a consequence, obtain a practical and functional solution to manage to reduce or eliminate the inconveniences and limitations revealed in the state of the art.

More particularly, it is one of the objectives of the present invention, to provide a new independent header to be coupled and uncoupled from a sugar cane and/or sorghum harvesting machine that has the ability to perform height adjustments of the base cutting disk assembly independently and, with that, adjust the cutting height of the plant stems in a simple, adequate and safe way, but also with low energy and fuel consumption.

It is also another objective of the present invention to provide an agricultural harvester, particularly intended for the harvesting of tall and stemmed vegetable crops, such as sugar cane and sorghum, which is configured to allow the mobile connection of an independent header as mentioned above.

Thus, with the objective of achieving the technical and functional effects summarized above, among others, the present invention refers to a new independent header for agricultural machines that comprises at least one base cutting assembly mounted in a floating manner in relation to the structural frame through the provision of at least one pantographic arm and at least one actuator.

According to a particular embodiment of the present invention, said independent header is formed by a structural frame on which row divider assemblies formed by lollipops associated with their respective ground pads are installed, at least one tipping roller to the at least one base cutting assembly is mounted downstream of said tipping roller, and is formed by a drive box from which two rotary axes project, the ends of which support the base cutting discs provided with blades, said at least one base cutting assembly is mounted on a mobile structural assembly comprising at least one pantographic arm and at least one actuator which are associated with said base cutting assembly drive box.

Additionally, as mentioned above, the present invention deals with an agricultural harvester, particularly intended for harvesting tall and stemmed plants, which comprises technical and constructive features configured to receive the above-mentioned independent header.

BRIEF DESCRIPTION OF THE DRAWINGS

The characteristics, advantages, and technical effects of the present invention, as indicated above, will be better understood by those skilled in the art from the detailed description below, made merely by way of example, and not restrictive of possible embodiments, and with reference to the attached schematic figures, which.

DESCRIPTION OF THE EMBODIMENTS OF THE INVENTION

Figure 1:
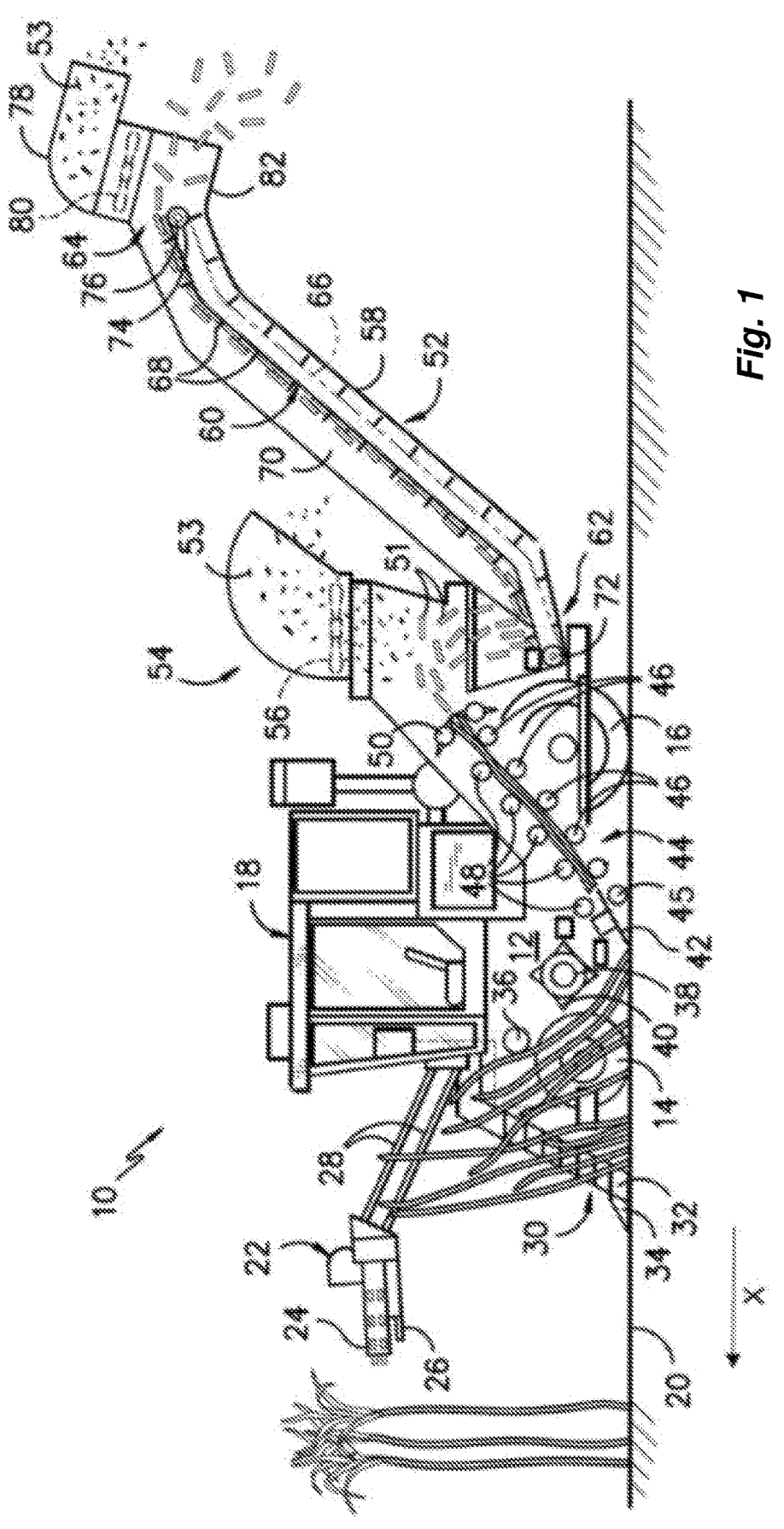
FIG. 1 is a schematic side view of a harvesting machine known in the state of the art and intended for harvesting tall and stemmed vegetable crops, such as sugar cane and sorghum.

The invention will now be described with respect to its particular embodiments, with reference to the attached figures. Such figures are schematic, and their dimensions and/or proportions may not correspond to reality, since they only aim to describe the invention in a didactic way. Furthermore, certain known and common construction details may have been omitted in order to obtain a great clarity and conciseness of the description that follows. Reference numerals used are repeated throughout the figures to identify identical or similar parts. Terms eventually used such as "above", "below", "front", "behind", "right", "left" etc. and its variants must be interpreted according to the orientation given in FIG. 1.

With reference now to the drawings, FIG. 1 illustrates a side view of an embodiment of an agricultural harvester 10 according to aspects known in the prior art. Harvester 10 is configured as a sugar cane harvester. However, in other embodiments, the harvester 10 may correspond to any suitable agricultural harvester known in the art, such as sorghum and cane energy.

As shown in FIG. 1, the harvester 10 includes a chassis 12, a pair of front wheels 14, a pair of rear wheels 16, and an operator's cabin 18. The harvester 10 may also include a primary source of power (for example, a frame-mounted motor) which powers one or both pairs of wheels 14, 16, via a transmission (not shown). Alternatively, the harvester 10 can be a harvester driven on tracks 15 and therefore can include tracks driven by the motor mechanism in place of the illustrated wheels 14, 16, such as the model of machine represented in FIG. 2A. The motor mechanism can also drive a hydraulic fluid pump (not shown) configured to generate pressurized hydraulic fluid to drive various harvester hydraulic components of the machine 10.

Additionally, the harvester 10 may include various components for cutting, processing, cleaning and unloading sugar cane as cane is harvested from an agricultural field 20.

For example, the harvester 10 may include a tipping cutter assembly 22 positioned at its front end to intercept sugar cane as the harvester 10 is moved in the forward direction represented by the arrow X. As shown, the tipping cutter assembly 22 can include both a binder disk 24 and a cutter disk 26. The binder disk 24 can be configured to bind sugar cane stems so that the cutter disk 26 can be used to cut off the tip of each stem. Generally, the height of the tipping cutter assembly 22 can be adjusted by means of a pair of arms 28 hydraulically raised and lowered, as desired by the operator.

Additionally, the harvester 10 may include a crop divider assembly 30 that extends upwards and rearwards from the field 20. In general, the crop divider assembly 30 may include spiral feed rollers 32, also known as a "lollipop". Each feed roller 32 may include a soil pads 34, as its lower end assists the row divider assembly 30 in separating sugar cane stems for harvesting. Additionally, as shown in FIG. 1, the harvester 10 can include a dropper roller 36 positioned adjacent to the front wheels 14 and a projection roller 38 positioned behind the dropper roller 36. As the dropper roller 36 is rotated, the cane stems are rotated. Harvested sugar canes are tumbled while the row divider assembly 30 pulls the stems from the agricultural field 20 into the machine 10. Additionally, as shown in FIG. 1, the projection roller 38 can include a plurality of fins 40 intermittently mounted that assist in forcing the sugar cane stems down. As roller 38 is rotated during harvesting, the sugar cane stems that have been dropped by the dropper roller 36 are separated and subsequently tipped by roller 38 as the harvester 10 continues to be moved forward with respect to the field 20.

Also referring to FIG. 1, the harvester 10 may also include a base cutter assembly 42 positioned behind the roller 38. As is generally understood, the base cutter assembly 42 may include blades (better shown in the remaining figures) to cut the sugar cane stems as the cane is harvested. The blades, located on the periphery of the assembly 42, can be turned by a hydraulic motor (also better represented in the other figures) driven, for example, by the vehicle's hydraulic system. Additionally, in several embodiments, the blades can be angled downward to cut the base of the sugar cane as the cane is tipped over by roller 38.

As should be appreciated by those skilled in the art, these components and mechanisms arranged in the front portion of the machine 10 can be mounted on an independent header, such as the object of the present invention and discussed above in relation to some models of agricultural equipment of the state of the art, thus allowing the exchange and replacement of these elements for the proper adaptation and configuration of the machine 10 to the specificities of the vegetable crop that is intended to be harvested in the field 20.

Furthermore, the harvester 10 may include an assembly of one or more conveyor rollers 44 located downstream of the base cutter assembly 42 for moving the cut sugar cane stems from the base cutter assembly 42 along the processing path. As shown in FIG. 1, a lifting roller 45 is disposed between the base cutter assembly 42 and the conveyor roller assembly 44, wherein the purpose of this lifting roller is to lift the cut cane from the ground 20 and lead it to the set of conveyor rollers 44 that is formed by a plurality of lower rollers 46 and a plurality of upper rollers 48. As the sugar cane is conveyed through the conveyor roller assembly 44, waste (for example, stones, dirt and/or the like) may also be transported or dropped through the lower rollers 46 onto the field 20.

Additionally, the harvester 10 may include a chopper assembly 50 located at the downstream end of the conveyor roller assembly 44 (for example, adjacent the rearmost lower and upper conveyor rollers 46, 48). In general, the chopper assembly 50 can be used to cut or shred the harvested sugar cane stems into smaller pieces or "chunks" or fragments 51 that may, for example, measure 15.24 centimeters (six inches), also called billets or grinding wheels. The fragments 51 can then be propelled towards an elevator assembly 52 of the harvester 10 to be collected in an external receiver or storage device (not shown).

As is generally understood, pieces of waste 53 (for example, dust, dirt, leaves, etc.) separated from the sugar cane fragments 51 can be expelled from the harvester 10 through a primary waste extractor assembly 54, which is located behind the chopper assembly 50 and is oriented to direct the waste 53 out of the harvester 10. Additionally, a fan 56 can be mounted on the primary extractor 54 to generate sufficient suction or vacuum force to capture the waste 53 and forcing the waste 53 through the primary extractor 54. The waste 53 is then directed out and generally away from the harvester 10 through an outlet of the primary extractor 54. The separated debris 51 and heavier than the waste 53 being expelled from extractor 54, they may then fall into elevator assembly 52.

As shown in FIG. 1, the elevator assembly 52 may generally include an elevator housing 58 and an elevator 60 extending within the elevator housing 58 between a lower proximal end 62 and an upper distal end 64. In general, the elevator 60 may include a chain or conveyor belt 66 and a plurality of paddles or flights 68 coupled or evenly spaced on the chain 66. The flights 68 may be configured to hold the sugar cane fragments 51 in the elevator 60 as the fragments 51 are lifted towards the top of elevator 70. Additionally, elevator 60 may include lower and upper sprockets 72, 74 positioned around proximal and distal ends 62, 64, respectively. As shown in FIG. 1, an elevator motor 76 can be coupled to one of the sprockets (for example, top sprocket 74) to drive chain 66, thereby allowing chain 66 and paddles 68 to travel in an endless loop between the proximal and distal ends 62, 64 of the elevator 60.

In addition, pieces of waste 53 (for example, dust, dirt, leaves, etc.) separated from the sugar cane fragments 51 can be expelled from the harvester 10 through a secondary waste extractor assembly 78 coupled to the rear end of the elevator 58. As shown in FIG. 1, secondary extractor assembly 78 may be located adjacent to the distal end 64 of the elevator 60 and may be oriented to direct waste 53 away from harvester 10. Additionally, a fan 80 can be mounted on the secondary extractor 78 to generate a sufficient suction force or vacuum to extract the waste 53 and force the waste 53 through the secondary extractor 78. The separated fragments 51, heavier than the waste 53, are expelled through the extractor 78, may then fall from the distal end 64 of the elevator 60. Typically, the fragments 51 may fall through a discharge opening 82 of the elevator assembly 52 into a device. External storage device (not shown), such as a cart, transfers, dumpster, etc.

During the operation, the harvester 10 is traveled throughout the agricultural field 20 to harvest sugar cane. After the height of the tipping cutter 22 is adjusted (if used) by means of the arms 28, the binder disk 24 in the tipping cutter assembly 22 can be operated in such a way as to bind the sugar cane tops according to the harvester 10 proceeds through the field 20, while the cutter disc 26 cuts the leafy ends of the sugar cane stems to dump them along both sides of the harvester 10. As the stems enter the row divider assembly 30, the pads 34 can configure the width of the operation to determine the amount of sugar cane that enters the inlet opening of the harvester 10, either fixed or adjustable. The lollipops 32 then coalesce the stems at the entrance to the machine to allow the tipping roller 36 to bend the stems downward in concert with the action of the winged roller 38. Once the stems are positioned at an angle as shown in FIG. 1, the base cutter assembly 42 can then cut the base of the field stems 20. The cut stems are then lifted by the lifting roller 45 and directed to conveyor roller assembly 44.

The cut sugar cane stems are conveyed backwards by conveyor rollers 46, 48 which compress the stems and harvested matter. At the downstream end of the conveyor roller assembly 44, the chopper assembly 50 cuts or chops the compacted sugar cane stems into pieces or fragments 51. Conveyed waste 53 (for example, dust, dirt, leaves, etc.) separated of the sugar cane fragments 51 are then drawn through the primary waste extractor assembly 54 using the suction or vacuum created by the blower 56. The separated/washed fragments 51 then fall into the elevator assembly 52 and travel upwards via the elevator 60 from its proximal end 62 to distal end 64. During normal operation, once fragments 51 reach distal end 64 of the elevator 60, fragments 51 fall through discharge opening 82 to an external storage device. Similar to primary extractor 54, waste is blown out of harvester 10 through secondary waste extractor assembly 78 with the aid of the fan 80.

A harvester machine as described above may be a sugar cane harvester that can be adapted to comprise and receive an independent header for harvesting sugar cane and/or sorghum, in accordance with the present invention, and said harvester machine 10 can be, for example, a cane harvester model from CNH Industrial N.V. commercialized under the brand name Case IH.

The terms referred to here as harvester, combine and their variants are used interchangeably to designate a machine for harvesting vegetable crops.

Additionally, in order to better clarification, although the figures represent a header configured for harvesting two rows of planting and, therefore, composed with the front elements in duplicate, as should be appreciated by those skilled in the art, the header for harvesting sugar cane and/or sorghum 100, according to the present invention, can be configured to carry out the harvest in only one planting row or multiple planting rows, varying according to the interests of projects and market demands, without interfering with the scope of protection.

Figures 2A, 2B:
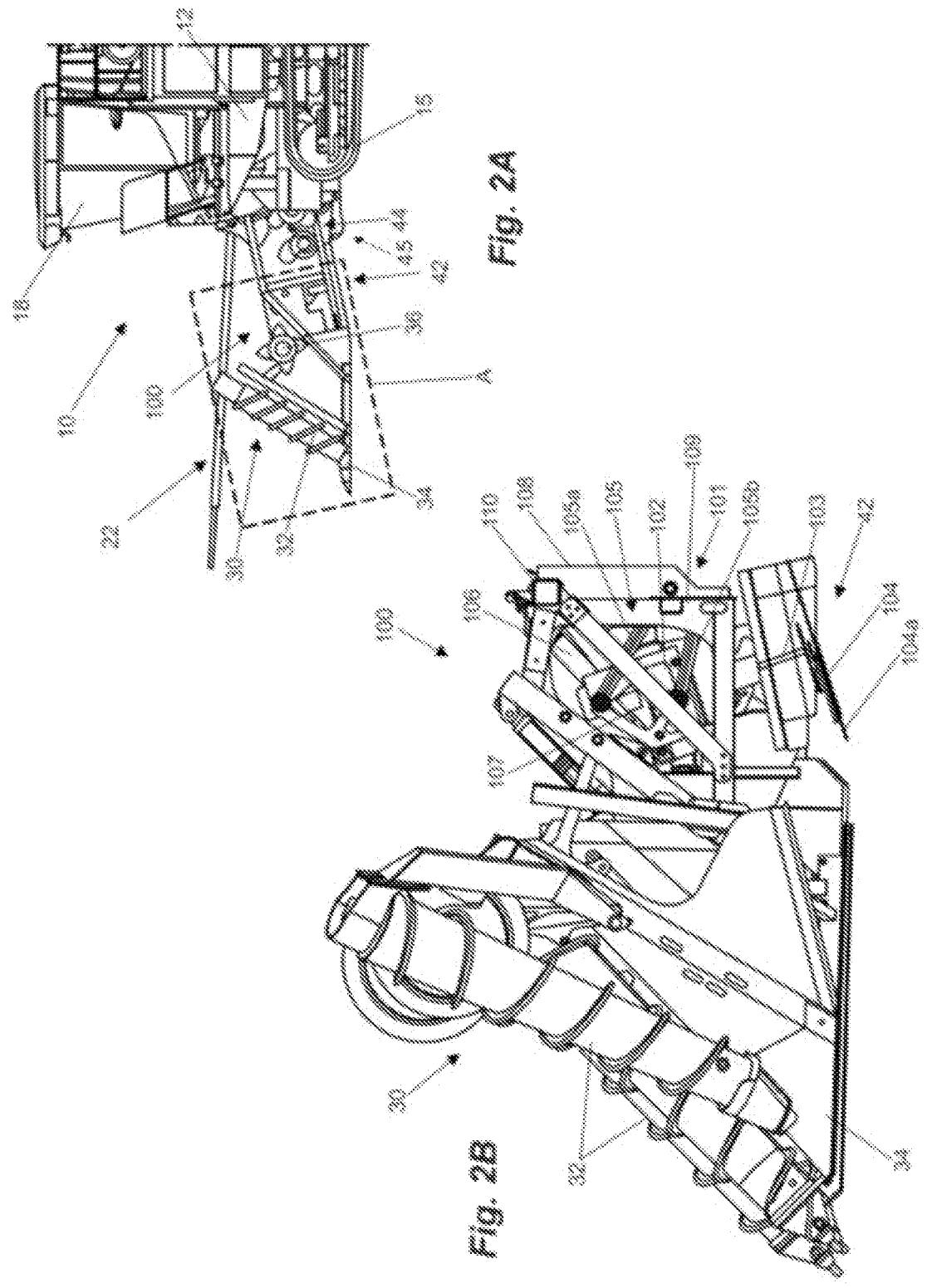
FIG. 2A is a side view of the front part of a harvesting machine with a schematic representation of an independent header for harvesting sugar cane and/or sorghum.
FIG. 2B is an enlarged side view of the independent header for harvesting sugar cane and/or sorghum represented in detail A of FIG. 2A.
Figure 3:
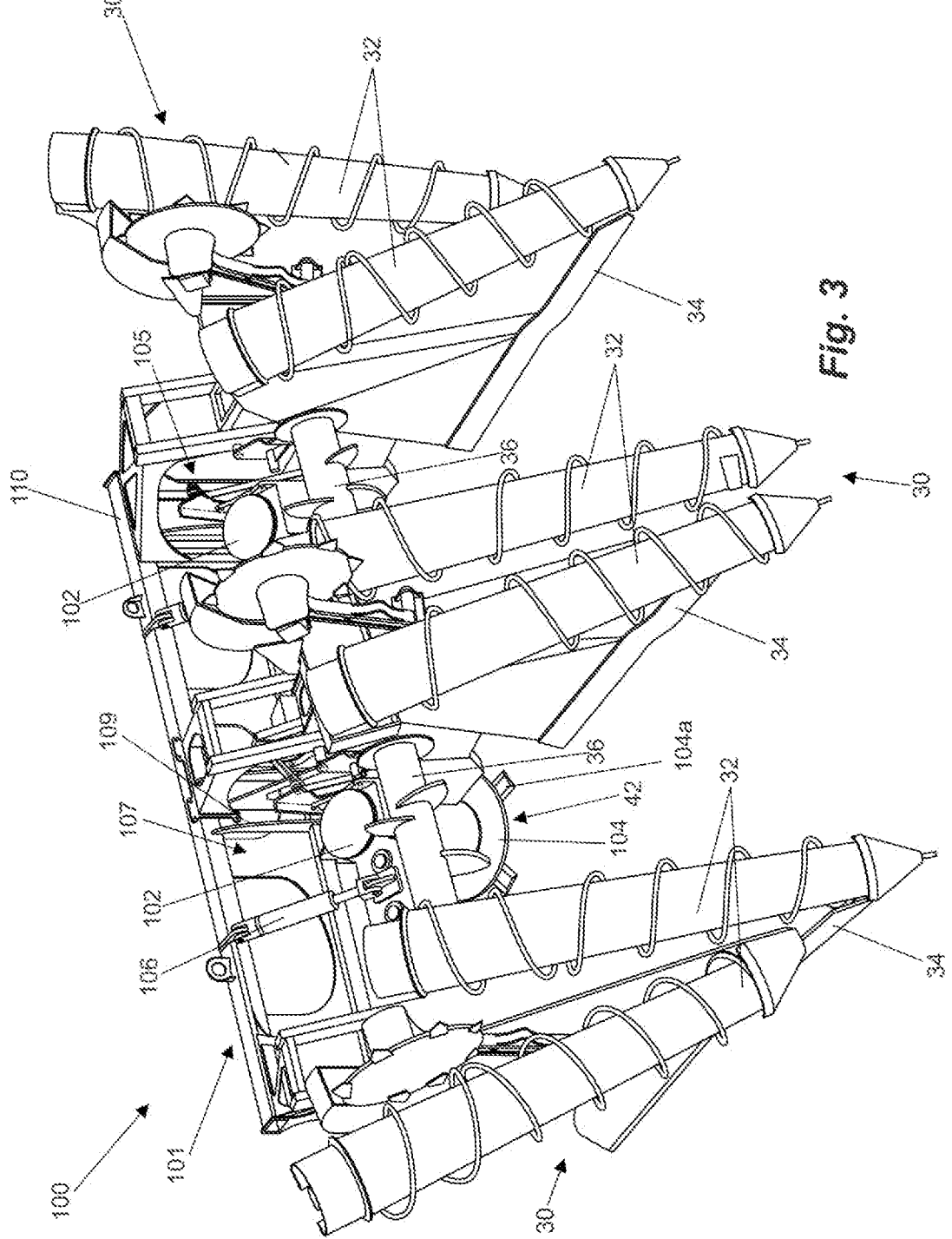
FIG. 3 is a schematic perspective view of the independent header for harvesting sugar cane and/or sorghum according to the present invention.
Figure 4:
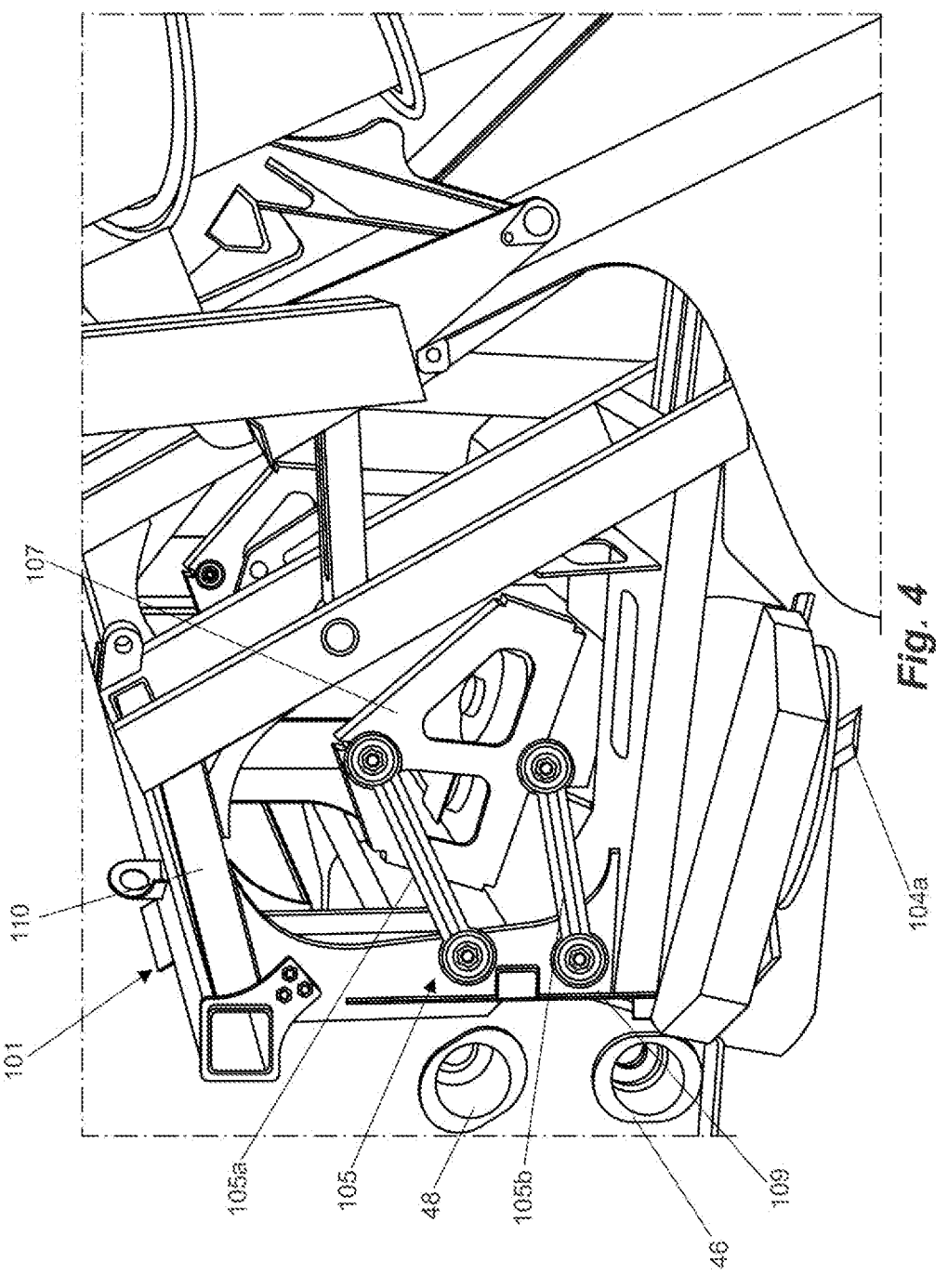
FIG. 4 shows a schematic side view of the independent header for harvesting sugar cane and/or sorghum according to the present invention.
Figure 5:
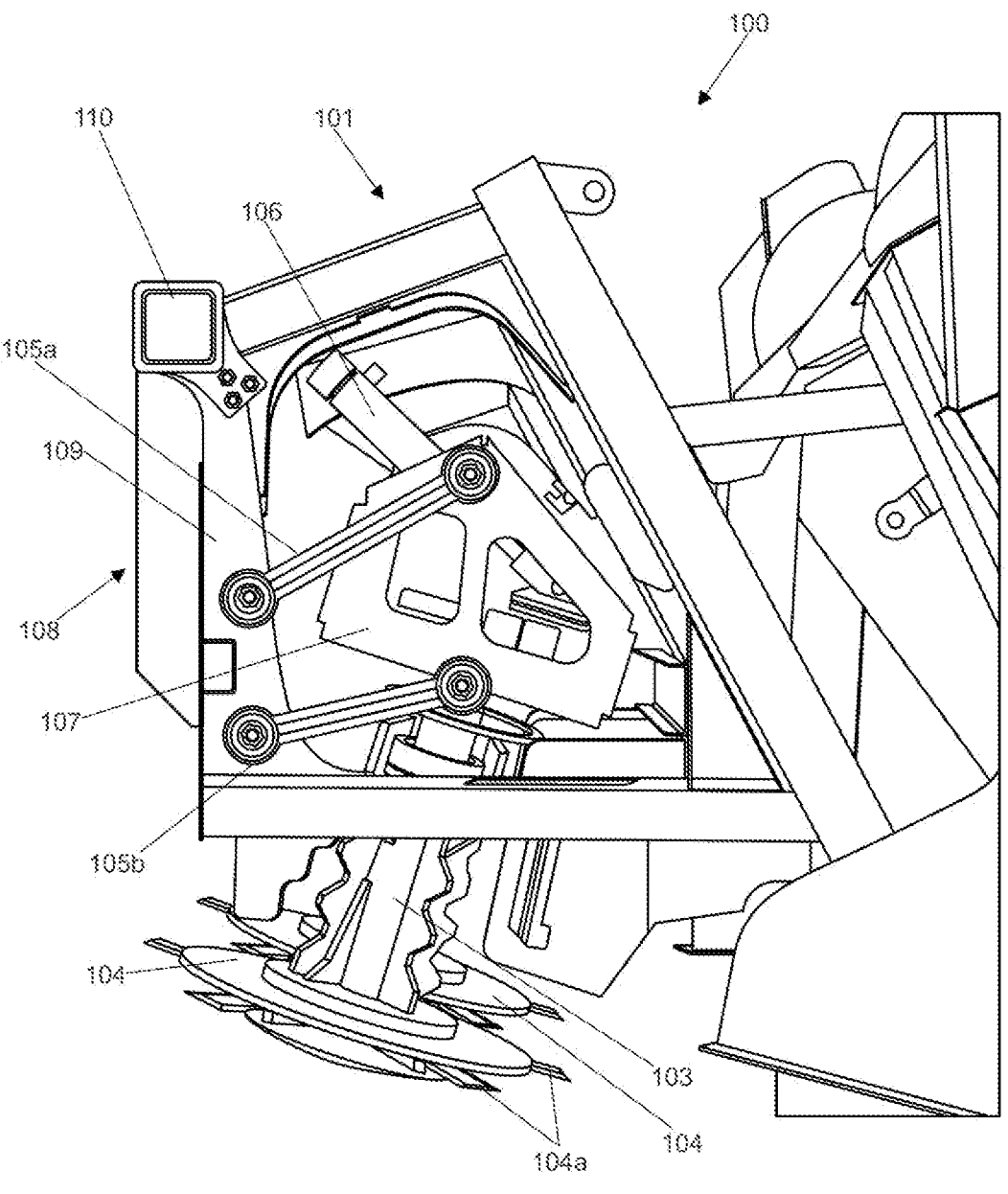
FIG. 5 shows another side view, similar to FIG. 4, but without the representation of some elements to facilitate the visualization of constructive details of the header according to the present invention.
Figure 6:
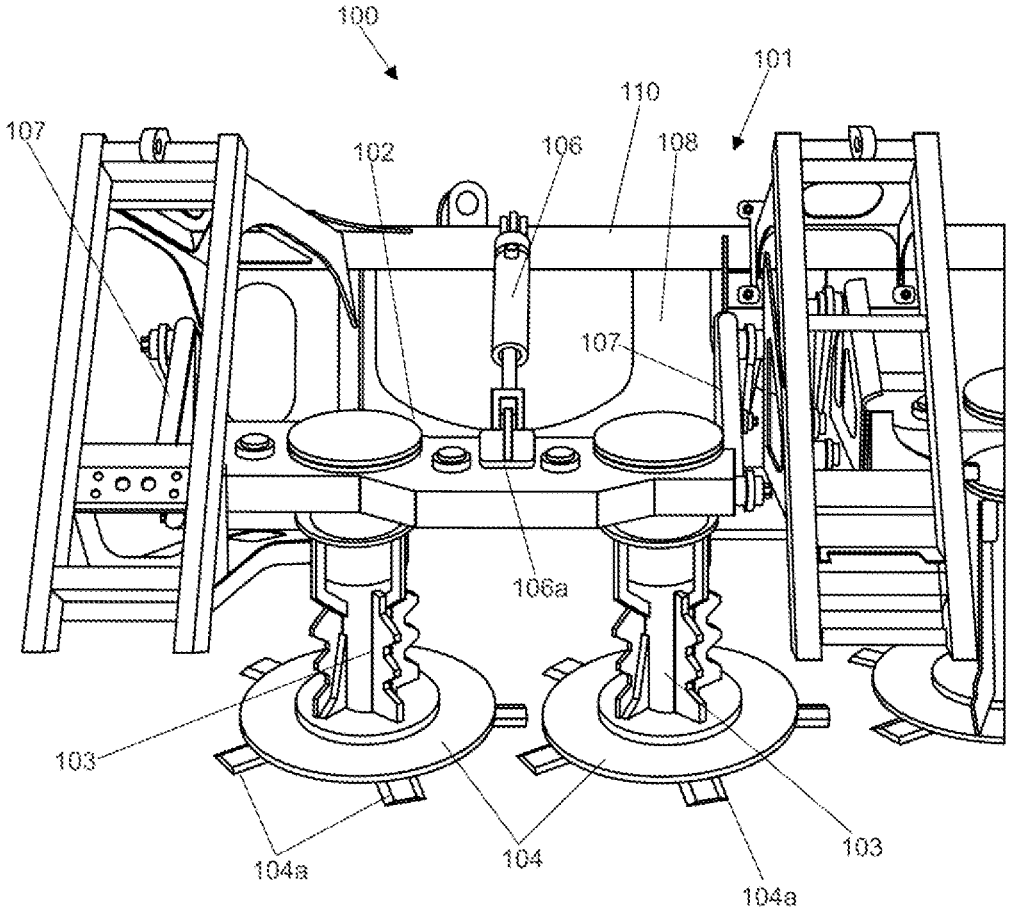
FIG. 6 shows a schematic front view of a portion of the header according to the present invention.
Figure 7:
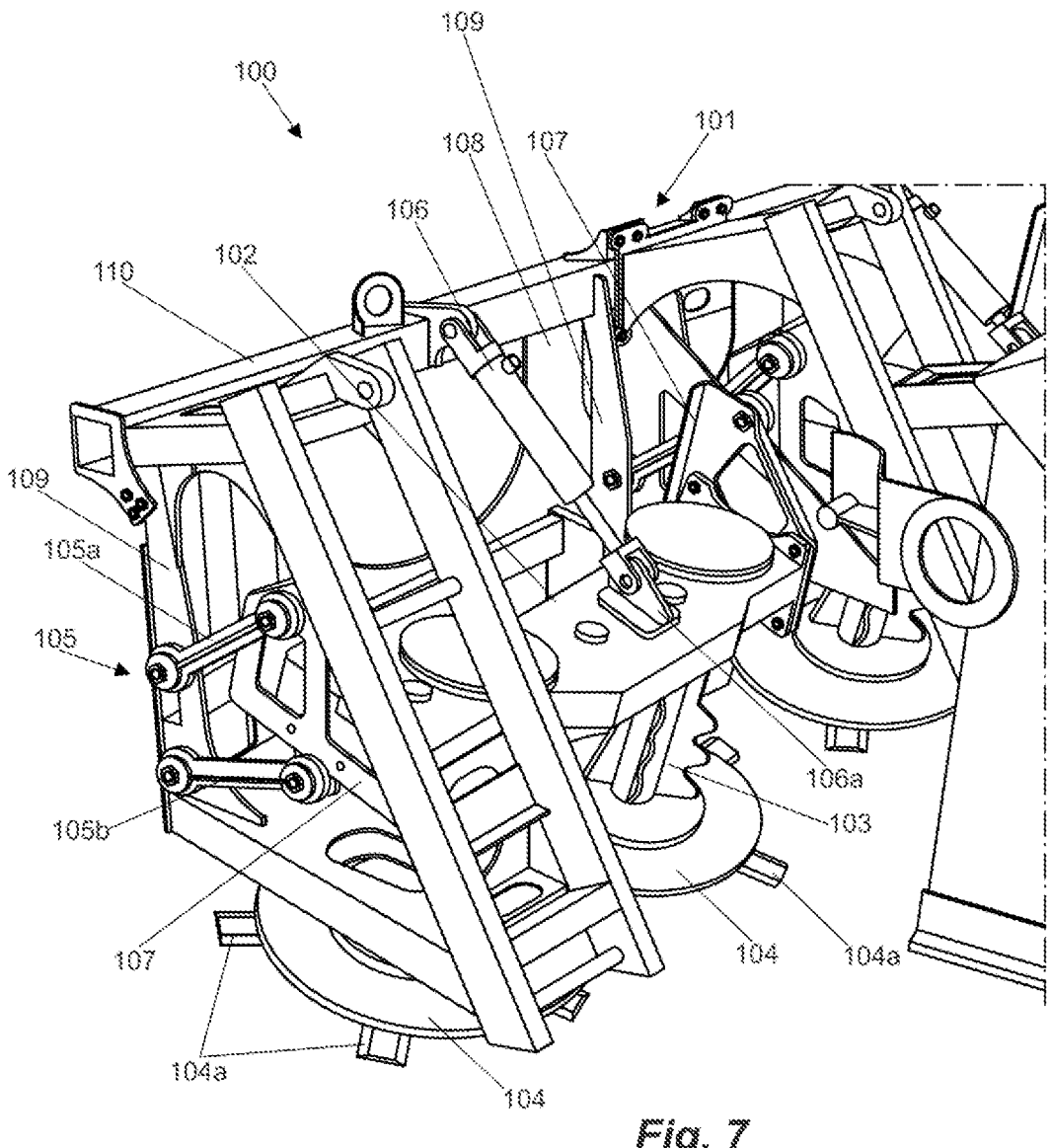
FIG. 7 shows a schematic perspective view of a portion of the header according to the present invention.
Figure 8:
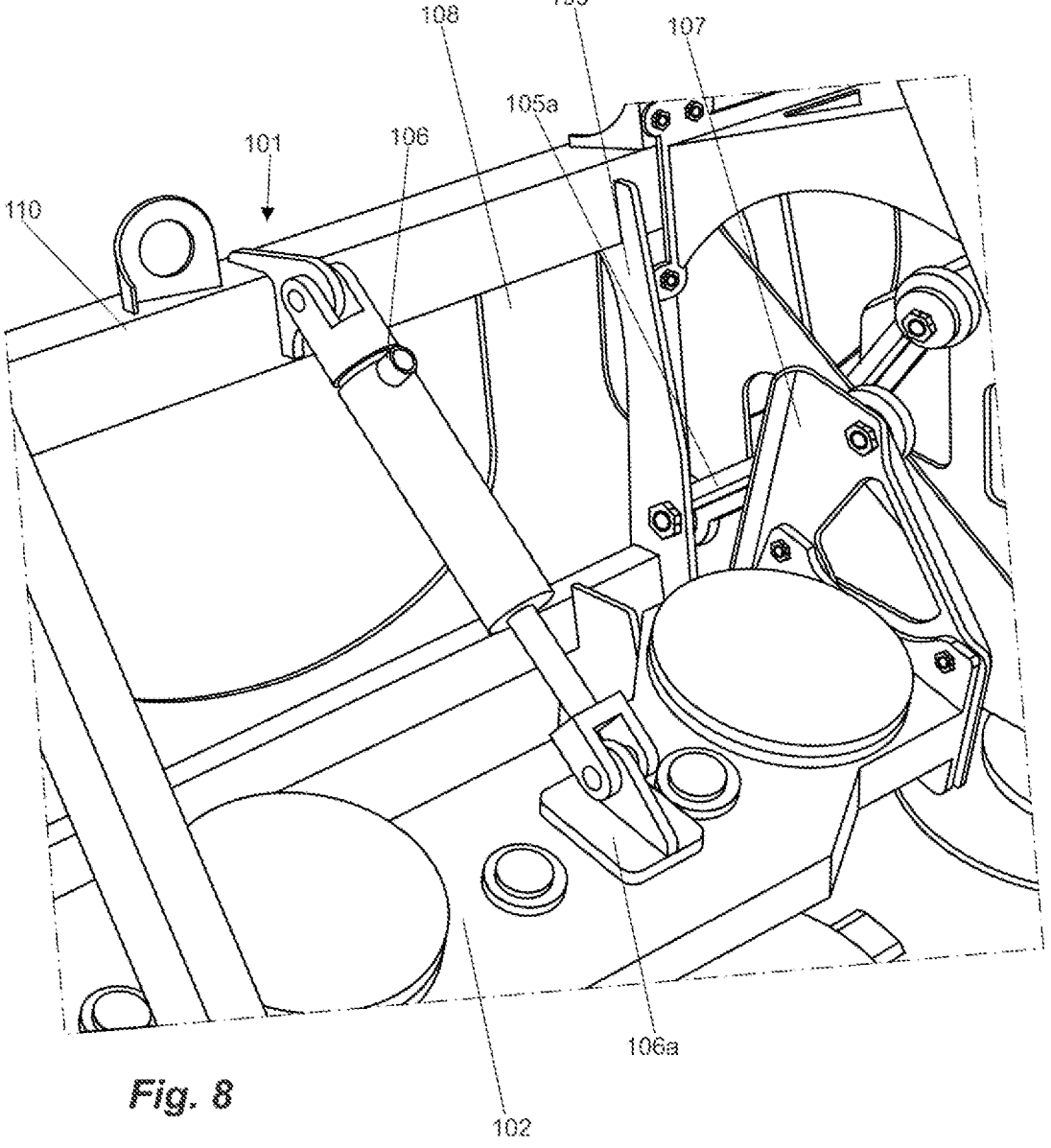
FIG. 8 shows an enlarged perspective view of a portion of the independent header for harvesting sugar cane and/or sorghum according to the present invention.

Now, referring to the other figures, and particularly in relation to FIG. 2A, the independent header for harvesting sugar cane and/or sorghum 100, according to the present invention, is schematically represented coupled to a harvester machine 10, adjacent to the entry of the chassis 12 along with the lifting roller 45 and adjacent to the first conveyor rollers 46, 48 of the conveyor roller assembly 44. In FIGS. 2B and 3, it is possible to observe said header 100 disconnected from the machine 10, and basically being formed by a structural frame 101 on which said row divider assemblies 30 are installed, comprising said lollipops 32 together with their respective ground pads 34 for separating and directing the cane stems for harvesting. Furthermore, said independent header 100 has at least one tipping roller 36 arranged upstream of the base cutting assembly 42, which is formed by a drive box 102 from which two rotary axes 103 project, the ends of which support the base cutting discs 104 provided with blades 104a for cutting the cane and/or sorghum stems as the harvest is carried out along the field 20.

In this context, according to the present invention, said drive box 102 of the base cutter assembly 42 is mounted on a mobile structural assembly comprising at least one pantographic arm 105 and at least one actuator 106 that are associated to said drive box 102 to, in this way, provide the vertical displacement of the base cutter assembly 42, dynamically controlling and adjusting the height of the cut performed at the base of the cane or sorghum stem, that is, allowing the adjustment of the height of cut as machine 10 moves across field 20.

According to one embodiment of the present invention, said mobile structural assembly, where the drive box 102 of the base cutting assembly 42 is mounted, comprises at least one, and advantageously two side supports 107, on which the drive box 102 is installed, being that, in this case, one of the ends of the bars 105a, 105b of the respective pantographic arm 105 are mounted on each of said lateral supports 107, while the opposite ends of these bars are mounted adjacent to the structural frame 101.

Said at least one actuator 106 is installed adjacent to the structural frame 101 of the platform 100 and can connect the center of the drive box 102 to provide a balance of efforts during drives. Optionally, as should be appreciated by those skilled in the art, said actuator 106 can connect to the sides of the drive box 102, or even to said side supports 107.

Therefore, as can be seen, the base cutter assembly 42 is mounted in a floating manner in relation to the structural frame 101, since this base cutter assembly 42 is associated with the structural frame 101 of the platform through said at least one pantographic arm 105 and the at least one actuator 106.

This at least one actuator 106 can be, according to an embodiment of the present invention, an electric, pneumatic or hydraulic actuator, and in the latter case it is even possible to take advantage of the existing hydraulic system and responsible for supplying pressurized hydraulic fluid used for the activation of the different components and mechanisms of the harvesting machines 10.

More particularly, according to one embodiment of the present invention, the independent header for harvesting sugar cane and/or sorghum 100 is formed by a structural frame 101 comprising a rear panel 108 provided with vertical crossbeams 109 and at least a horizontal crosspiece 110, said drive box 102 being mounted on the mobile structural assembly comprising two side supports 107, each mounted on the lateral ends of said drive box 102, and are associated with said vertical crosspieces 109 by means of the bars 105a, 105b of the respective pantographic arms 105. Said actuator 106, in this case, is mounted on an articulated base 106a anchored in the center of the drive box 102 and is associated with said vertical crosspiece 110 of the rear panel 108 of the structural frame 101.

Figure 9A:
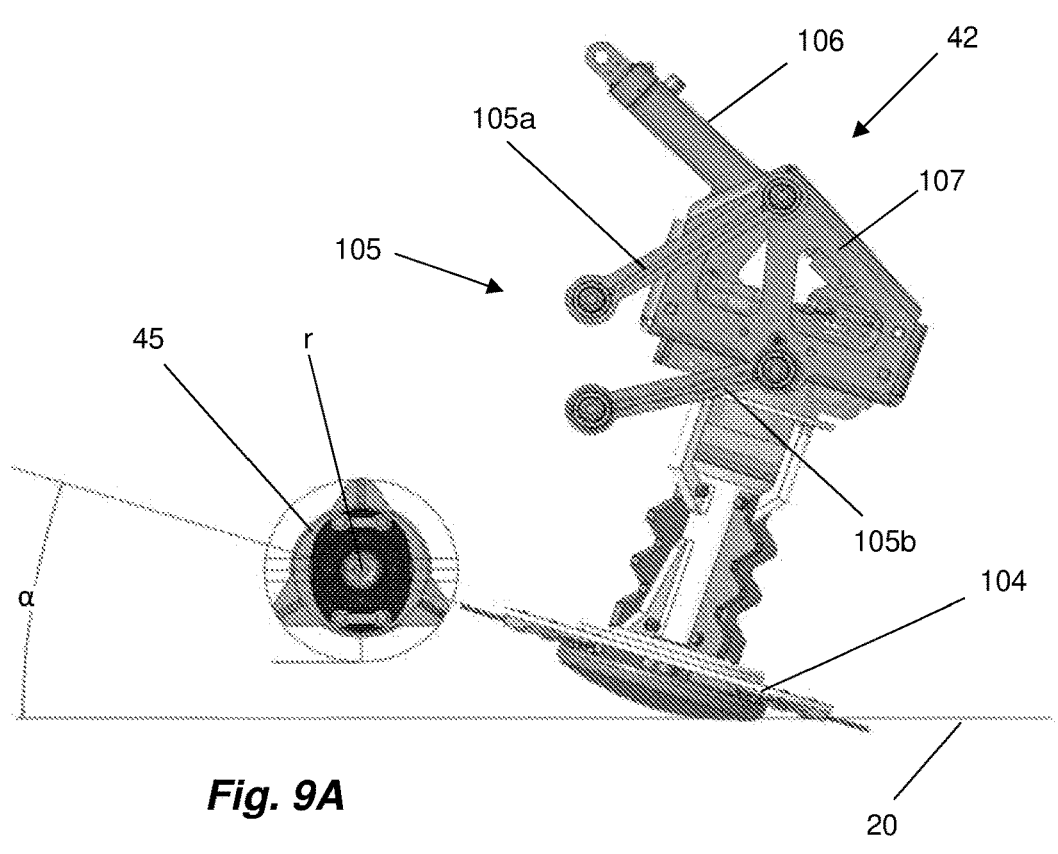
FIGS. 9A and 9B show side views of the positioning of the base cutter assembly of the header, in accordance to the present invention, in relation to the lifting roller of the harvester in different heights.
Figure 9B:
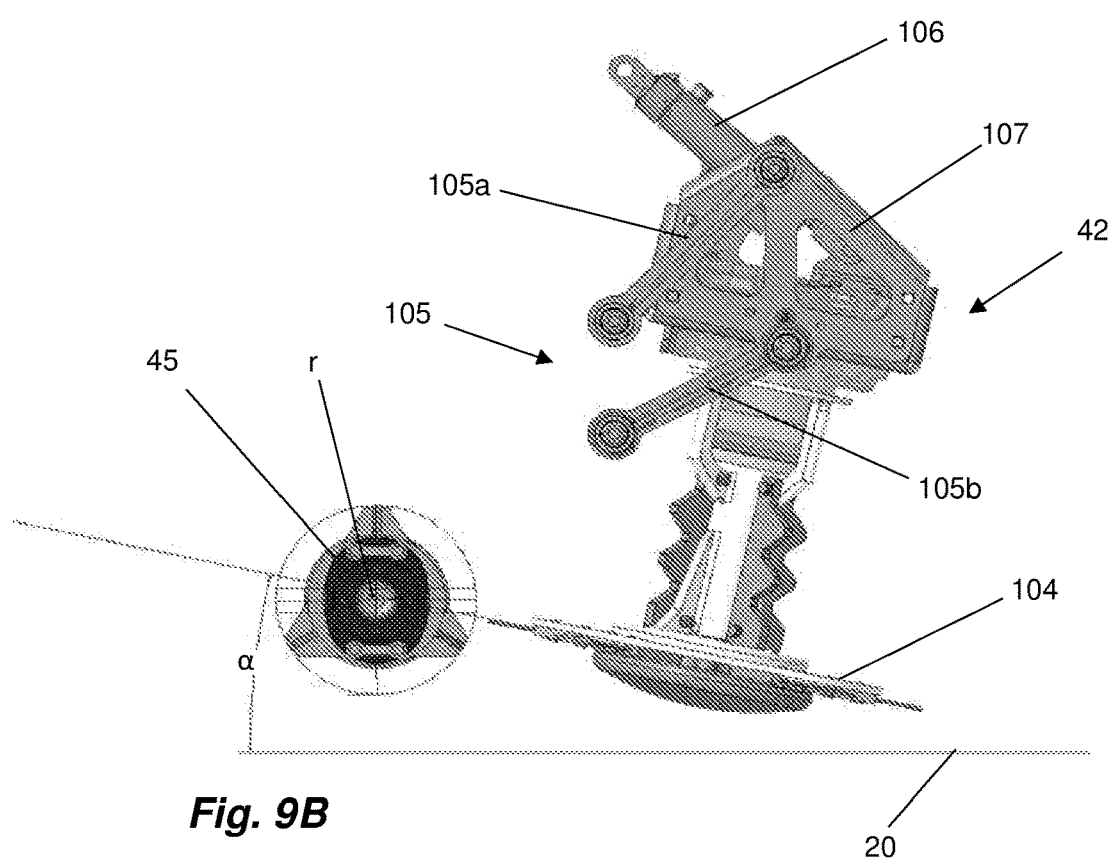

More particularly, according to a particular embodiment of the present invention, and as shown in FIGS. 9A and 9B, said bars 105a, 105b of the respective pantographic arm 105 are mounted in such a way as to obtain a geometric configuration designed to maintain alignment of the base cutting discs 104 with the center (r) of the lifting roller 45, that is, regardless of the height of the base cutting assembly 42, said base cutting discs 104 will remain aligned with the center (r) of the lifting roller 45 that is mounted at a relatively fixed height next to the chassis 12 of the machine 10. This alignment is important to obtain greater work efficiency when cutting and driving the sugarcane or sorghum, executing the cutting of the sugarcane in a condition that allow the lifting rollers 45 to more properly lift and drag the cane towards the processing path formed by the conveyor rollers 44.

Thus, as should be observed by those skilled in the art, and according to a particular embodiment of the present invention, said geometric configuration of the pantographic arms 105 is obtained by the arrangement of the upper bar 105*a* being greater than the lower bar 105*b*. Therefore, the movement caused by the actuator 106 causes the base cutting assembly 42 to move vertically and the base cutting disks 104 remain aligned with the center (r) of the lifting roller 45.

According to a more particular embodiment, the arrangement of the bars 105*a* and 105*b* of the pantographic arm 105 promotes the movement of the base cutting assembly 42 in order to obtain a variation of the angle (α) formed by the inclination of the cutting disks 104, always aligned with the center (r) of the lifting roller 45, said variation is around 10° and 20°, and more particularly between 12° and 18°.

The present invention also relates to an agricultural harvester, such as the harvester machine 10 for harvesting tall and stemmed plants, which is configured to receive an independent header for harvesting sugar cane and/or sorghum 100, in accordance to the object of the present invention, wherein said header 100 comprises at least one base cutting assembly 42 mounted in a floating manner through a mobile structural assembly formed by at least one pantographic arm 105 and at least one actuator 106 that is associated with the drive box 102 of the base cutting assembly.

Considering all of the above, the independent header 100 intended to be coupled to harvesting machines 10, as defined by the present invention, allows obtaining high productivity agricultural equipment, since it becomes possible to overcome the inconveniences caused by possible unevenness along the planting rows through the control and dynamic adjustment of the cut height of the plant stems and, with this, obtain the most adequate cut and close to the ground, reducing the risks of loss of harvest material.

The purpose of this description is only to present and define, by way of example, preferred embodiments of the independent header designed to be coupled to harvesting machines for harvesting tall and stemmed plants, according to the present invention. Therefore, as those skilled in the art should appreciate, various modifications and combinations of equivalent elements and details are possible without thereby escaping the scope of protection defined by the attached claims.

The invention claimed is:

1. An independent header of an agricultural machinery, the header comprising:
   a structural frame;
   at least one base cutting assembly mounted in a floating manner in relation to the structural frame through the mobile structural assembly, the at least one base cutting assembly comprising:
   base cutting discs comprising blades;
   a drive box;
   two rotating shafts projecting from the drive box with ends of the two rotating shafts supporting the base cutting discs;
   a mobile structural assembly comprising:
      at least one pantographic arm comprising an upper bar and a lower bar;
      at least one actuator; and
      at least one side support on which at least one side of the drive box is mounted, wherein the at least one side support is coupled to the structural frame through the at least one pantographic arm;

one or more row divider assemblies comprising spiral feed rollers associated with a respective ground pad; and
at least one tipping roller,
   wherein the at least one base cutting assembly is mounted downstream of the at least one tipping roller.

2. The header according to claim 1, wherein the at least one actuator is positioned adjacent to the structural frame and at a center of the drive box of the base cutting assembly.

3. The header according to claim 1, wherein the at least one actuator is installed adjacent to the structural frame and to the drive box.

4. The header according to claim 1, wherein the at least one actuator is electric, pneumatic, or hydraulic.

5. The header according to claim 1, wherein the mobile structural assembly further comprises two side supports;
   wherein the structural frame comprises a rear panel having vertical crossbeams and at least one horizontal crossbeam;
   wherein lateral ends of the drive box are mounted to respective ones of the two side supports and are associated with the vertical crossbeams by bars of the at least one pantographic arm; and
   wherein the actuator is mounted on an articulated base anchored in a center of the drive box and is associated with the vertical crossbeam of the rear panel of the structural frame.

6. The header according to claim 1, wherein the upper and lower bars of the at least one pantographic arm are mounted in a manner enabling a geometric configuration that maintains alignment of the base cutting discs with a center of a lifting roller of the harvesting machine.

7. The header according to claim 6, wherein the geometric configuration of the at least one pantographic arm is obtained by arranging the upper bar to be larger than the lower bar.

8. The header according to claim 1, wherein variation of an angle formed by inclination of the cutting discs is between 12° and 18°.

9. An agricultural harvester comprising the header of claim 1.

10. An agricultural harvester comprising:
   a chassis;
   a header structural frame coupled to the chassis;
   at least one base cutting assembly comprising a drive box;
   a mobile structural assembly comprising:
      at least one pantographic arm;
      at least one actuator; and
      at least one side support on which one side of the drive box is mounted; and
   wherein the at least one base cutting assembly is mounted in a floating manner in relation to the header structural frame through the mobile structural assembly; and
   wherein the at least one side support is coupled to the header structural frame through upper and lower bars of the at least one pantographic arm.

11. The agricultural harvester according to claim 10, further comprising:
   one or more row divider assemblies comprising spiral feed rollers associated with a respective ground pad; and
   at least one tipping roller;
   wherein the at least one base cutting assembly comprises base cutting discs that comprise blades; and
   wherein the at least one base cutting assembly is mounted downstream of the at least one tipping roller, the drive box, and two rotating shafts projecting from the drive box with ends of the two rotating shafts supporting the base cutting discs.

12. The agricultural harvester according to claim 10, wherein first ends of the upper and lower bars are mounted on the at least one side support of the mobile structural assembly; and wherein opposite ends of the upper and lower bars are coupled to the header structural frame.

13. The agricultural harvester according to claim 10, wherein the mobile structural assembly further comprises two side supports on which the drive box is mounted from; and wherein the two side supports are coupled to the header structural frame through the upper and lower bars of the at least one pantographic arm.

\* \* \* \* \*